United States Patent
Mori et al.

(10) Patent No.: US 8,559,087 B2
(45) Date of Patent: Oct. 15, 2013

(54) MULTI-BEAM LIGHT SOURCE DEVICE AND MULTI-BEAM LIGHT SCANNING DEVICE

(75) Inventors: Shogo Mori, Nagoya (JP); Junichi Yokoi, Toyoake (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 379 days.

(21) Appl. No.: 13/075,290

(22) Filed: Mar. 30, 2011

(65) Prior Publication Data

US 2012/0026566 A1     Feb. 2, 2012

(30) Foreign Application Priority Data

Jul. 27, 2010   (JP) ................................. 2010-168417

(51) Int. Cl.
  *G02B 26/08*   (2006.01)
  *B41J 2/435*   (2006.01)

(52) U.S. Cl.
  USPC .......................... 359/204.1; 347/263; 362/232

(58) Field of Classification Search
  USPC .......... 359/198.1, 204.1, 212.1, 216.1, 218.1, 359/219.1, 217.1; 347/245, 263; 362/232, 362/249.07, 249.09, 249.11, 259, 523, 529, 362/530
  See application file for complete search history.

(56) References Cited

U.S. PATENT DOCUMENTS

| | | | | |
|---|---|---|---|---|
| 5,999,345 | A * | 12/1999 | Nakajima et al. ............. | 359/821 |
| 6,201,556 | B1 * | 3/2001 | Bennett et al. ................ | 347/138 |
| 6,567,201 | B1 * | 5/2003 | Tsuchida ................... | 359/204.1 |
| 6,621,512 | B2 * | 9/2003 | Nakajima et al. ............. | 347/245 |
| 7,075,688 | B2 * | 7/2006 | Nakajima ................... | 359/204.1 |
| 7,729,031 | B2 * | 6/2010 | Nakamura et al. ......... | 359/212.1 |
| 7,800,641 | B2 * | 9/2010 | Kubo et al. ..................... | 347/245 |
| 7,952,605 | B2 * | 5/2011 | Seo et al. ....................... | 347/263 |
| 8,233,209 | B2 * | 7/2012 | Miyatake et al. .......... | 359/204.1 |
| 2004/0125192 | A1 * | 7/2004 | Ohsugi ......................... | 347/233 |
| 2008/0204841 | A1 * | 8/2008 | Suzuki et al. ................. | 359/204 |

FOREIGN PATENT DOCUMENTS

| | | |
|---|---|---|
| JP | 06-036324 | 2/1994 |
| JP | 06-021014 | 3/1994 |
| JP | 11-072729 | 3/1999 |
| JP | 2005-070495 A | 3/2005 |
| JP | 2007-003594 | 1/2007 |
| JP | 2007-121341 A | 5/2007 |
| JP | 2007-183326 | 7/2007 |
| JP | 2008-145956 A | 6/2008 |

OTHER PUBLICATIONS

JP Decision to Grant dtd Nov. 6, 2012, JP Appln. 2010-168417.

(Continued)

*Primary Examiner* — Frank Font
(74) *Attorney, Agent, or Firm* — Banner & Witcoff, Ltd.

(57) ABSTRACT

A multi-beam light source device and a multi-beam scanning device including the multi-beam light source device are provided. The multi-beam light source device includes: a light source including: a cylindrical package having a side edge portion which extends in a rotational direction about a rotational axis line defined as a first direction; a plurality of light emitting units which are disposed in the cylindrical package and configured to emit laser light in the first direction; and a housing which holds the light source. The housing has a holder that holds the side edge portion of the cylindrical package to be relatively rotatable in the rotational direction. The holder is formed with at least one opening which exposes the side edge portion of the light source.

14 Claims, 11 Drawing Sheets

(56) References Cited

OTHER PUBLICATIONS

JP Office Action dtd Apr. 17, 2012, JP Appln. 2010-168417, English Translation.

JP Office Action dtd Jul. 7, 2012, JP Appln. 2010-168417, English translation.

* cited by examiner

MULTI-BEAM LIGHT SOURCE DEVICE AND MULTI-BEAM LIGHT SCANNING DEVICE

CROSS-REFERENCE TO RELATED APPLICATION

This application claims priority from Japanese Patent Application No. 2010-168417, filed on Jul. 27, 2010, the entire subject matter of which is incorporated herein by reference.

TECHNICAL FIELD

Aspects of the present invention relate to a multi-beam light source device including a light source having a plurality of light emitting units and a multi-beam light scanning device having a light source device.

BACKGROUND

A related-art image funning apparatus, such as a laser printer, has a light scanning device that enables light from a light source to be incident onto a polygon mirror (polygonal rotating mirror) and scans reflected light thereof to expose a surface of a photosensitive member. As the light scanning device, there has been known a multi-beam scanning device that includes a light source having a plurality of light emitting points.

Additionally, there has been known a light scanning device that holds a light source configured by a semiconductor laser and a coupling lens for converting diffusion light from the light source into light flux with one holding member (JP-A No. 11-72729). The holding member is screw-engaged to a main body of the light scanning device by a screw and the like. Thereby, the light source and the coupling member are positioned with respect to an optical system of the main body of the light scanning device.

According to the above multi-beam scanning device, the light source is positioned as described in JP-A No. 11-72729. In other words, the light source is pressed in a holder and fixed to the holder by an adhesive. The holder having the light source fixed thereto is entirely rotation-adjusted with respect to an optical box having the polygon mirror. By the rotation-adjustment, a pitch between laser lights that are scanned to a photosensitive member from a plurality of light sources is adjusted at an appropriate interval.

According to the related art device, the rotation of the light sources is adjusted through the holder, which holds the light sources, so as to adjust the pitch of the light sources. However, according to this configuration, even when rotating the holder about a center of the light source serving as a rotational axis line, if there is a deviation (tolerance) between sizes of the pressed portions of the holder and the optical element, the rotational axis line is deviated during the adjustment. Thus, a direction of an optical axis of the laser light is changed or inclined. In other words, according to the conventional configuration, it is difficult to precisely adjust the pitch interval between the laser lights. Due to this, even when adjusting the rotation of the holder that holds the light sources, the pitch between the laser lights is not precisely adjusted. As a result, an exposure position on the photosensitive member is deviated from a normal position, which affects image quality.

SUMMARY

Accordingly, it is an aspect of the present invention to provide a multi-beam light source device and a scanning device having a configuration capable of easily adjusting a light source with high precision.

According to an illustrative embodiment of the present invention, there is provided a multi-beam light source device comprising: a light source including: a cylindrical package having a side edge portion which extends in a rotational direction about a rotational axis line defined as a first direction; a plurality of light emitting units which are disposed in the cylindrical package and configured to emit laser light in the first direction; and a housing which holds the light source. The housing has a holder that holds the side edge portion of the cylindrical package to be relatively rotatable in the rotational direction. The holder is formed with at least one opening which exposes the side edge portion of the light source.

According to another illustrative embodiment of the present invention, there is provided a multi-beam scanning device comprising: the above multi-beam light source device; an optical element configured to convert the laser light emitted from the source into light flux; and a deflector configured to deflect light, which is converted into the light flux.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

[Overall Configuration of Laser Printer]

Figure 1:
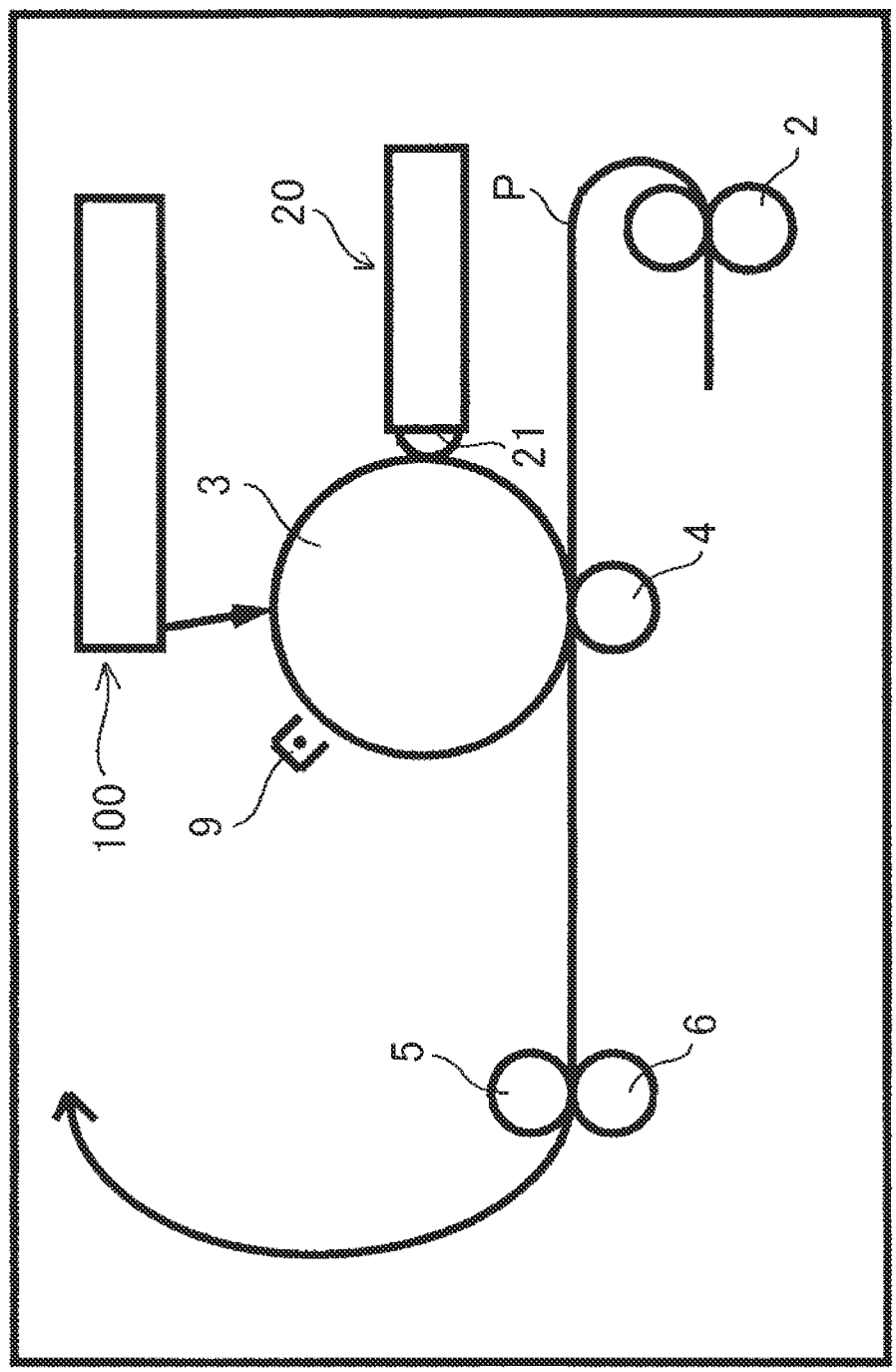
FIG. 1 schematically illustrates a configuration of a laser printer.

Hereinafter, illustrative embodiments of the present invention will be described with reference to the drawings. As shown in FIG. 1, a laser printer 1 has a pair of conveyance rollers 2 that conveys a sheet P that is fed one by one from a sheet feeding tray (not shown).

The sheet P conveyed by the conveyance rollers 2 is sent between a photosensitive drum 3 and a transfer roller 4.

In addition to the transfer roller 4, a charger 9, a laser scanner unit 100 (an example of a multi-beam scanning device) and a developing unit 20 are sequentially mounted at an outer circumference of the photosensitive drum 4 from an upstream side of the rotation direction.

The charger 9 is a positive scorotron-type charger that generates corona discharge from a wire for discharge and is configured to positively charge a surface of the photosensitive drum 3 uniformly. The laser scanner unit 100 scans and exposes the photosensitive drum 3 with the laser light using a device that will be described below. In addition, the developing unit 20 supplies toner (not shown), which is positively charged, to the surface of the photosensitive drum 3 through a developing roller 21.

Accordingly, as the photosensitive drum 3 is rotated, the surface of the photosensitive drum 3 is positively charged uniformly by the charger 9 and is then exposed in a main scanning direction by high speed scanning of two laser lights from the laser scanner unit 100, so that an electrostatic latent image corresponding to printing data is formed. The two laser lights are arranged in line at a predetermined interval (pitch) in a sub-scanning direction perpendicular to a main scanning direction and are respectively scanned in the main scanning direction.

Then, when toner, which is positively charged, is supplied from the developing unit 20 to the photosensitive drum 3, the toner is supplied to an exposed part of the electrostatic latent image formed on the surface of the photosensitive drum 3, which part is exposed by the laser lights and thus has a lowered potential. Hence, the toner is selectively attached and becomes a visible image, so that a toner image is formed.

The transfer roller 4 is configured so that a transfer bias (transfer forward bias) is applied thereto from a transfer bias applied power source (not shown). Accordingly, the toner attached on the surface of the photosensitive drum 3 is transferred on the sheet P while the sheet P passes between the photosensitive drum 3 and the transfer roller 4. After the toner transfer, the sheet P is sandwiched between a heating roller 5 and a pressing roller 6, so that the toner is heat-fixed on the sheet, which is then discharged on a sheet discharge tray.

[Configuration of Scanner Unit]

Figure 2:
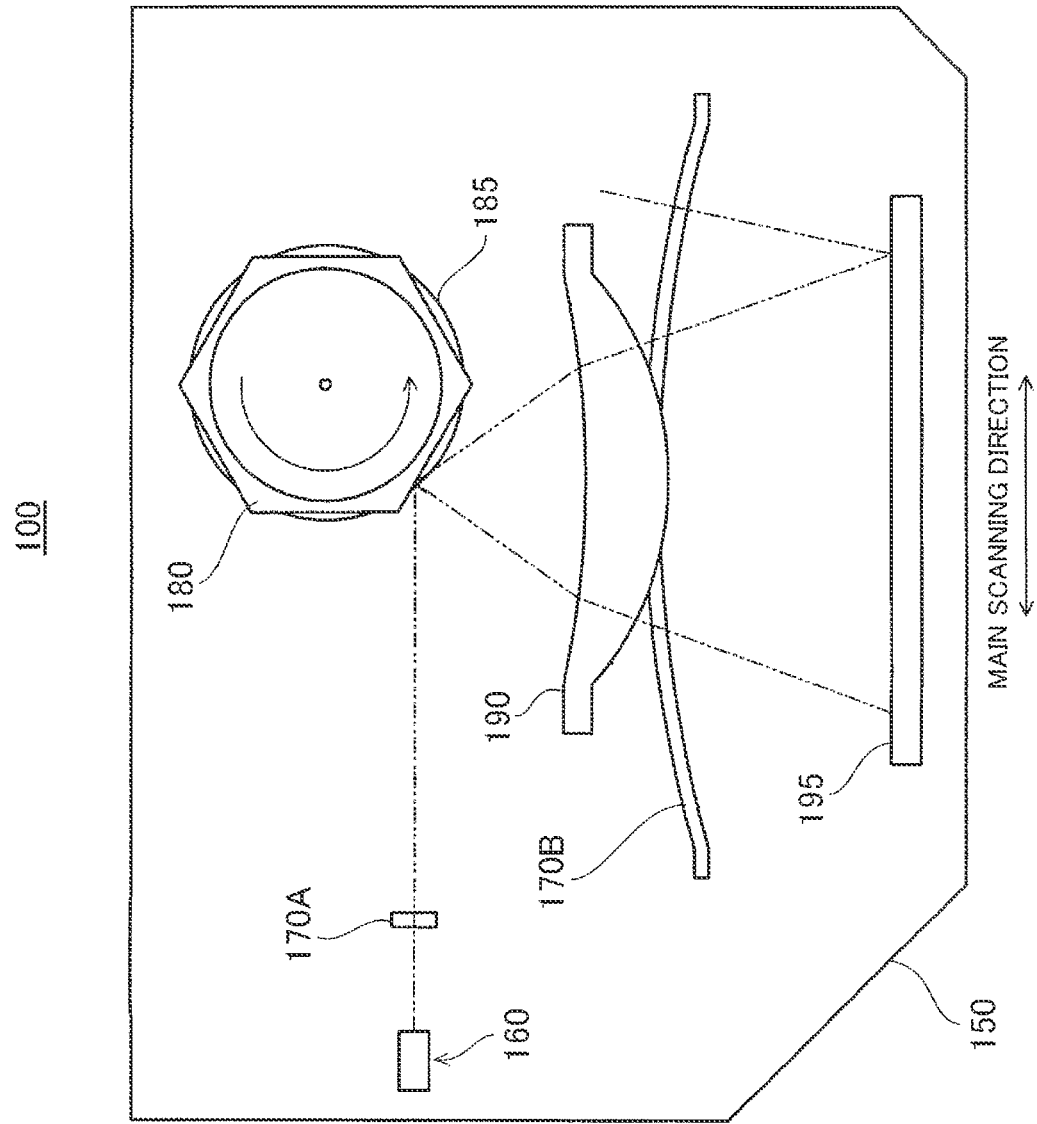
FIG. 2 is a plan view of an inside of a scanner unit.

The specific configuration of the scanner unit 100 will be described. As shown in FIG. 2, the scanner unit 100 includes a light source device 160 that has a semiconductor laser and a coupling lens (not shown) and emits laser light, cylindrical lenses 170A, 170B that converge the laser light emitted from the light source device 160, a polygon mirror 180 (an example of a deflector), an fθ lens 190, a reflector 195 and the like. Those elements are fixed to a first housing 150 made of resin. In the meantime, a configuration of the first housing 150 for fixing the light source device 160 will be specifically described below.

The polygon mirror 180 has mirror surfaces at respective sides of a regular polygon (hexagon in this illustrative embodiment). When the polygon minor is rotated by a polygon motor 185, it reflects, deflects and scans the laser light, which is emitted from the light source device 160, in the main scanning direction.

The fθ lens 190 concentrates the laser light, which is scanned at a constant angular velocity by the polygon mirror 180, on the photosensitive drum 3 and converts the laser light so that the laser light is scanned at a constant velocity. The reflector 195 reflects the laser light, which has passed through the fθ lens 190, toward the cylindrical lens 170B. The cylindrical lens 170B enables the laser light to be converged in the sub-scanning direction so as to re-concentrate the laser light, which is converged on the polygon mirror 180 in the sub-scanning direction, on the surface of the photosensitive drum 3.

By the above configuration, the laser light emitted from the light source device 160 is converged in the sub-scanning direction by the cylindrical lens 170A and is concentrated on the polygon mirror 180 that is being rotated.

The laser light is deflected and scanned in the main scanning direction by the rotation of the polygon mirror 180, passes through the fθ lens 190 and the other cylindrical lens 170B and is then scanned on the surface of the photosensitive drum 3.

[Configuration of Light Source Device]

Figure 3:
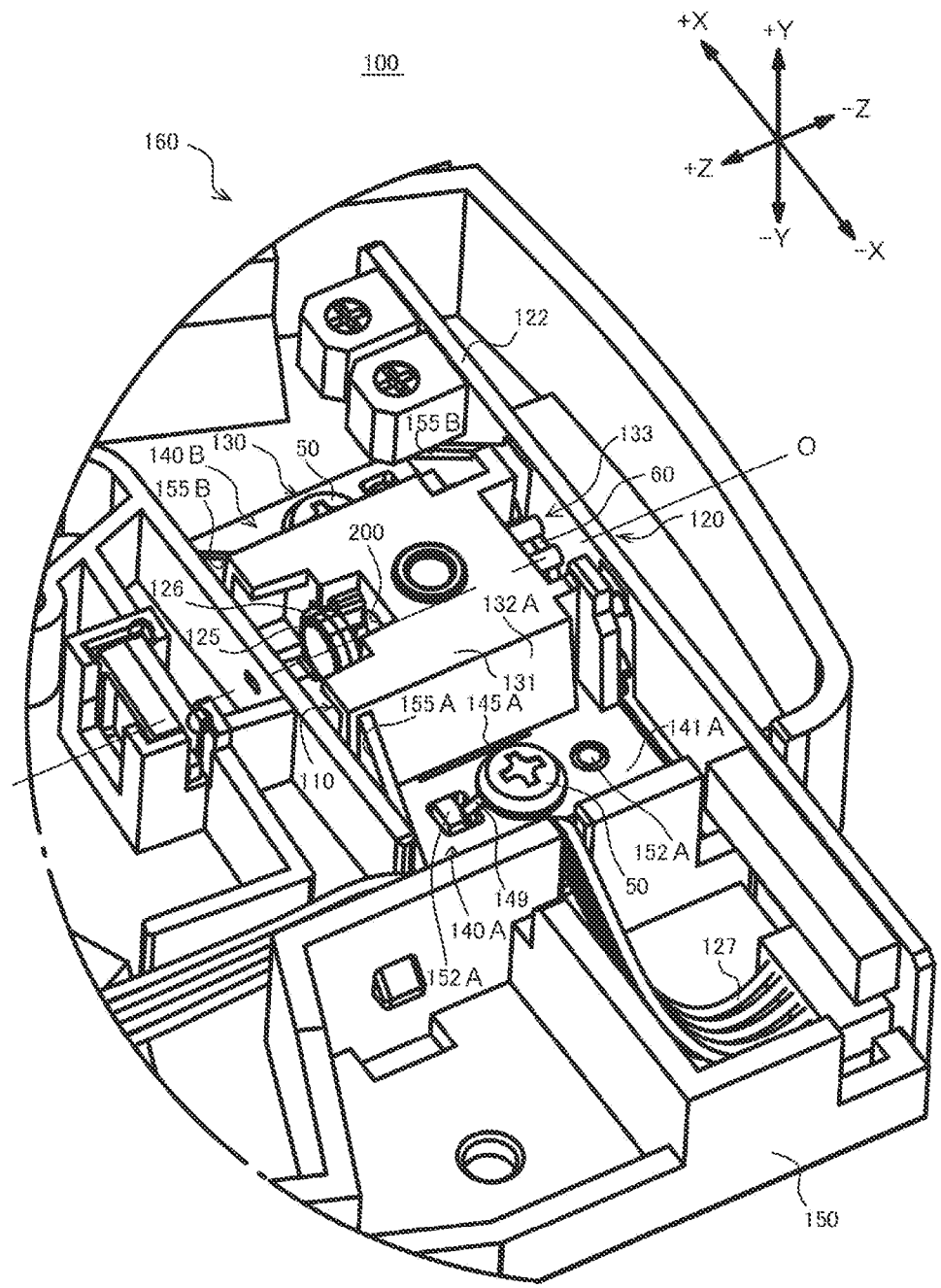
FIG. 3 is a perspective view showing a part of the scanner unit; which shows a light source device supported to a housing.
Figure 4:
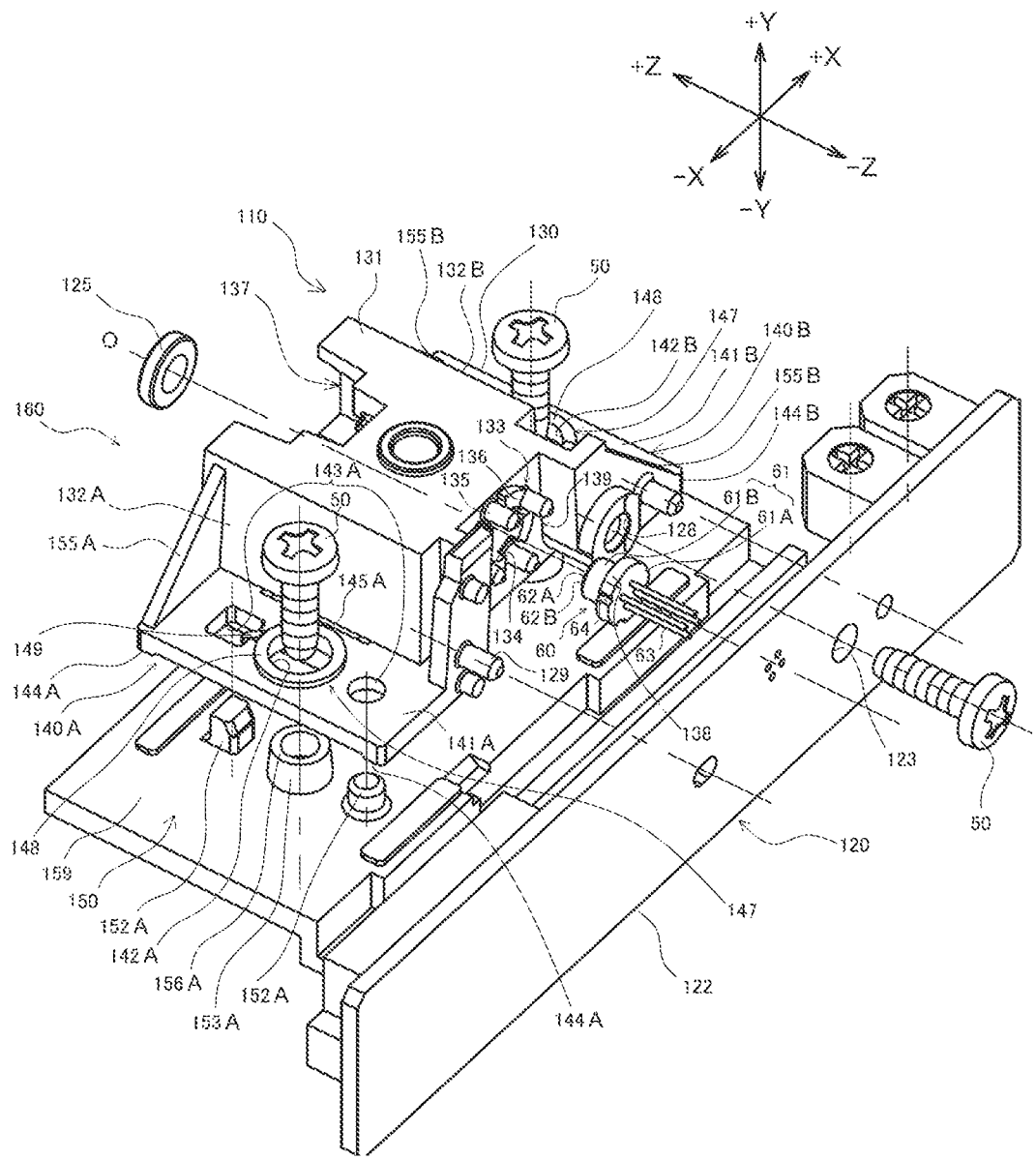
FIG. 4 is an exploded perspective view of the housing and the light source device.

Next, a configuration of the light source device 160 that is fixed to the first housing 150 will be described. As shown in FIGS. 3 and 4, the light source device 160 has a second housing 110 made of resin, a laser unit 120 that is integrally held to the second housing 110 and a coupling lens 125 (an example of an optical element).

In this illustrative embodiment, a traveling direction of the laser light that is converted into light flux by the coupling lens 125 is a Z axis direction, a direction along which the second housing 110 is attached to the scanner unit 120 is a Y axis direction and a direction extending in a direction perpendicular to the X and Z axes is an X axis direction. The Y axis direction is an upper-lower direction. In this illustrative embodiment, a virtual axis line extending in the traveling direction of the laser light that is converted into the light flux is referred to as an optical axis O.

As shown in FIG. 4, the laser unit 120 has a light source 60 and a circuit substrate 122 having a flat plate shape that is attached to the light source 60. The circuit substrate 122 is connected to a cable 127 that extends from a circuit (not shown) at the first housing 150. The circuit substrate 122 has an insertion hole 123 of a screw 50, which is opened so that the circuit substrate is screw-engaged with the second housing 110 by the screw 50.

The light source 60 includes a cylindrical package 61 made of metal, such as brass, laser diodes (LDs) 62A, 62B (an example of a light emitting unit) that emit laser light and pins 63 that protrude from the package 61.

The package 61 has a first cylindrical part 61A having a virtual rotational axis line (reference axis) in the Z axis direction (a first direction) and a second cylindrical part 61B that is concentric to the first cylindrical part 61A and has a diameter smaller than the first cylindrical part 61A. The first cylindrical part 61A has a substantially circular shape having a diameter R2, when seen from the Z axis direction and has a side edge portion 138 that extends in a rotational direction about the Z axis serving as a rotational axis line. A length of the side edge portion 138 in the Z axis direction is smaller than the diameter R2. In addition, a notch 64 is formed at a part of the side edge portion 138, which opposes an opening 139 (described later).

The second cylindrical part 61B receives two laser diodes (LDs) 62A, 62B therein. At least one of the laser diodes (LDs) 62A, 62B is arranged at a position deviating from the reference axis that is a center of the package 61. In other words, when the package 61 is rotated about the reference axis that is a center thereof, the positions of the laser diodes (LDs) 62A, 62B are changed. In the below descriptions, it will be described that the reference axis, which is a center of the package 61, coincides with the optical axis O for convenience' sake.

One ends of the four pins 63 are connected to the laser diodes (LDs) 62A, 62B in the package 61. The four pins 63 extend so that the other ends thereof are exposed to the outside from the first cylindrical part 61. The light source 60 configured as described above is electrically connected to the circuit substrate 122 by soldering the four pins 63 to the circuit substrate 122, for example.

The light source 60 connected to the circuit substrate 122 emits laser light based on an electric signal that is transmitted from the circuit substrate 122.

The second housing 110 includes a main body 130 having a box shape, a pair of extending parts 140A, 140B that extend from both lower ends of the Y axis direction of the main body 130 toward the X axis direction in a wing shape, and ribs 155A, 155B that extend between the extending part 140A and the main body 130 and between the extending part 140B and the main body 130. In the meantime, the second housing 110 is made of resin and the elasticity coefficient of the resin constituting the second housing 110 is greater than that of the first housing 150.

The main body 130 has a planar top surface part 131 that is perpendicular to the Y axis and side surface parts 132A, 132B that extend perpendicularly from both edges of the X axis direction of the top surface part 131 in a downward direction (−Y axis direction) and are opposed to each other in the X axis direction. In addition, the main body 130 has a light source holder 133 that holds the light source 60 in the −Z axis direction at both edges of the Z axis direction of the top surface part 131 and a lens holder 137 that holds the coupling lens 125 in the +Z axis direction. The light source holder 133 may be provided symmetrically with respect to the rotational axis line. The main body 130 is surrounded by the top surface part 131, the side surface parts 132A, 132B, the light source holder 133 and the lens holder 137 and has a space that is opened downwardly (−Y axis direction).

The light source holder 133 has a fitting hole 134 for fitting the light source 60, four holding protrusions 135 (an example of an extending part) that hold the light source 60 fitted in the fitting hole 134 and are and four adhesion parts 136 that are formed between the adjacent holding protrusions 135. The four holding protrusions 135 may be provided symmetrically with respect to the rotational axis line.

The fitting hole 134 is formed to communicate with the space in the main body 130 in the Z axis direction. An inner diameter of the fitting hole 134 is smaller than the first cylindrical part 61A and is greater than the second cylindrical part 61B. The four holding protrusions 135 and the four adhesion parts 136 are arranged to surround a periphery of the fitting hole 134.

Figure 5A:
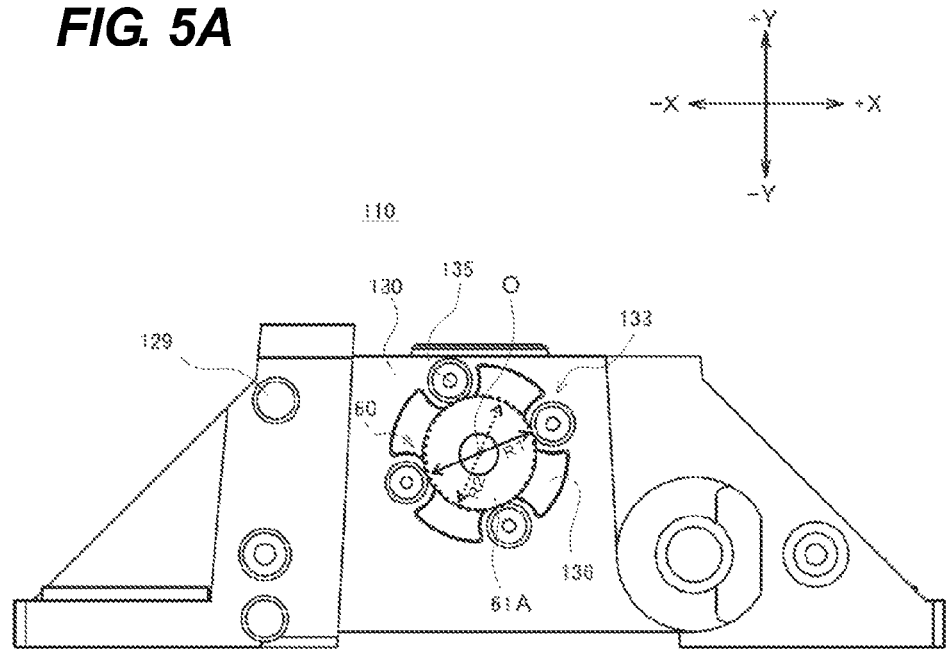
FIG. 5A is a front view of a second housing.

The holding protrusions 135 have a substantially cylinder shape, extend in the optical axis O and have tip ends that are arranged toward the −Z direction, respectively. The tip ends of the holding protrusions 135 are tapered. As shown in FIG. 5A, the four holding protrusions 135 are arranged at an interval in a rotational direction about the optical axis O. The four holding protrusions 135 form two pairs so that they are opposed to each other with the optical axis O being interposed therebetween. A distance R1 between the holding protrusions 135 of one pair, when seen from the Z direction, is slightly narrower than an outer diameter R2 (refer to a dotted virtual circle) of the first cylindrical part 61A of the optical source 60.

The light source 60 is assembled to the holding protrusions 135 configured as described above. Specifically, the light source 60 is assembled so that it is accommodated in a space among the four holding protrusions 135. At this time, the reference axis (which corresponds to the optical axis O), which is a cylinder center of the light source 60, faces the Z axis direction.

Figure 5B:
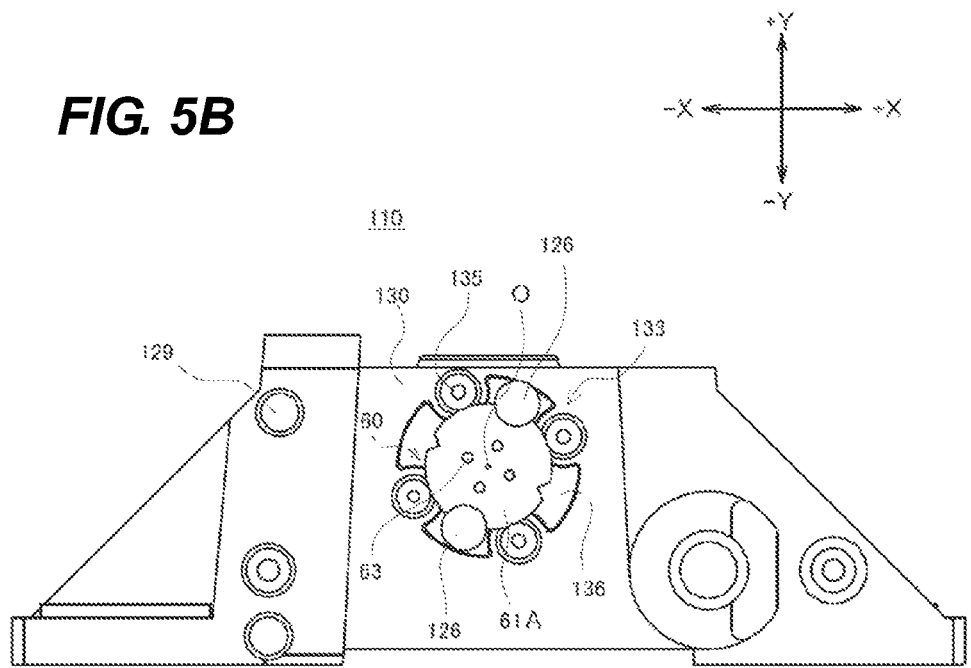
FIG. 5B shows a front of the second housing and a state where a light source is fixed to a light source holder by an adhesive.

As shown in FIG. 5B, the holding protrusions 135 to which the light source 60 is assembled hold the side edge portion 138 so that the light source 60 is pressed toward the reference axis (a cylinder center) when holding the light source 60. The pressing force applied by the holding protrusions 135 is such as to permit the light source 60 to rotate in the rotational direction.

In addition, the holding protrusions 135 are arranged at an interval. The intervals (spaces) become a plurality of openings 139 that expose the side edge portion 138 of the light source 60 when adjusting a position of the light source 60, which will be described later.

In other words, the openings 139 are defined between the adjacent holding protrusions 135 with respect to the rotational direction. The holding protrusions 135 are preferably arranged so that the reference axis (optical axis O) of the package 61 is positioned between the openings 139. More preferably, the openings 139 are arranged so that they are opposed to each other. In the meantime, the holding protrusions 135 of this illustrative embodiment are arranged at an interval of about 90 degrees about the optical axis O, when seen from the optical axis O direction.

The four adhesion parts 136 are formed between the adjacent holding protrusions 135, respectively. In other words, the adhesion parts 136 are arranged at positions overlapping with the openings 139, when seen from the Z axis direction. The adhesion parts 136 extend in the Z axis direction while forming a step portion at the main body 130. End portions of the adhesion parts 136 at the Z axis form a planar surface respectively. The extending amounts of the adhesion parts 136 in the Z axis direction are smaller than the holding protrusions. One side of each of the adhesion parts 136 has an adhesive 126 applied to after the position of the light source is adjusted.

The light source 60 is held at the light source holder 133 configured as described above. The light source 60 is linearly contacted to the holding protrusions 135 in the optical axis O direction while being held at the holding protrusions 135. In other words, the contact lines of the holding protrusions 135 and the light source 60 extend in the optical axis O direction. The light source 60 held by the light source holder 133 is rotation-adjusted about the optical axis O, which will be described later, and is then fixed to the second housing 110.

Furthermore, three contact protrusions 129 that contact the circuit substrate 122 and a second screw hole 129 for screw-engaging the circuit substrate 122 by the screw 50 are formed around the light source holder 133. The contact protrusions 129 are arranged at an interval in the Y axis direction and protrude from the main body 130 in the Z axis direction. In addition, top faces of the contact protrusions 129 form a planar surface, respectively.

The lens holder 137 is formed at a side of the main body 130 opposite to the light source holder 133. In other words, the lens holder 137 is formed at a position intersecting with the optical axis O.

The lens holder 137 has an outer side in the +Z direction and an inner side in the −Z direction, forms a shape recessed in the Z axis direction (the optical axis O direction) and opens the top surface part 131 (+Y axis direction). The lens holder 137 is formed with an opened light traveling hole 200 (refer to FIG. 3). The light traveling hole 200 is concentrically formed to the fitting hole 134, which is formed at the light source holder 133, about the optical axis O. In other words, the laser light emitted from the laser unit 120 passes through the space in the main body 130 and the light traveling hole 200 and is then emitted to the outside of the main body 130.

The coupling lens 125 is held at the lens holder 137 configured as described above. The coupling lens 125 is a substantially symmetric lens that is held at a side of the second housing 110 opposite to the light source holder 133 and converts the laser light having passed through a lens surface thereof into parallel light flux.

The coupling lens 125 is held at the second housing 110 through the adhesive 126 so that a center of the coupling lens coincides with the optical axis O (Z axis) of the laser light. The adhesive 126 is ultraviolet (UV) curing resin that is cured by illumination of UV light.

The adhesive 126 is filled between the lens holder 137 and the coupling lens 125. When the center of the coupling lens 125 substantially coincides with the optical axis O of the laser light, the coupling lens is held at the lens holder 137. The coupling lens 125 is held at the light source holder 133 and position-adjusted, which will be described later. After adjusting the position of the coupling lens 126, the adhesive 126 is cured by illumination of the UV light. Thereby, the coupling lens 125 is completely fixed (held) to the lens holder 137 by the adhesive 126.

The side surface parts 132A, 132B have a rectangular shape, respectively, when seen from the X axis direction. The side surface parts 132A, 132B have a long side in the optical axis O direction, respectively, and the surfaces thereof form planar surfaces extending in parallel with the optical axis O.

The extending parts 140A, 140B extend from lower ends of the side surface parts 132A, 132B in the −X axis direction and +X axis direction, respectively. The extending parts 140A, 140B are arranged at positions that are symmetrical to the optical axis O of the laser right with the main body 130 being interposed therebetween. More specifically, when the extending parts 140A, 140B are put on the first housing 150, they extend in parallel with a planar part 159 (which will be described later) of the first housing 150.

The extending parts 140A, 140B have flat plate parts 141A, first openings 142A, 142B that are formed at the flat plate parts 141A, 141B, a pair of positioning holes 143A, 143B, leg parts 144A, 144B and a convex part 147. In addition, second openings 145A, 145B are formed between the extending parts 140A, 140B and the side surface parts 132A, 132B of the main body 130. The configuration of the extending part 140A will be specifically described and the description of the extending part 140B having the substantially same shape as the extending part 140A will be omitted.

The flat plate part 141A is a plate shape having a long side in the optical axis O direction and a short side in the X axis direction, extends from a lower end edge of the side surface part 132A in the −X axis direction and is integrated thereto.

The first opening 142A has a circular shape that penetrates a center of the flat plate part 141A in the Y axis direction. A diameter of the first opening 142 is greater than an axial diameter of the screw 50 and is smaller than a diameter of a head of the screw.

The convex part 147 protrudes along the periphery of the first opening 142 at the outside (i.e., +Y direction-side) of the flat plate part 141A. The convex part 147 has a hollow cylindrical shape and protrudes in the +Y direction from the outside of the flat plate part 141A. An end portion of the +Y direction of the convex part 147 has a circular ring shape, when seen from the Y axis direction and is a planar screw bearing surface 148. The screw bearing surface 148 bears the head of the screw 50 that is inserted into the first opening 142A when the second housing 110 is screw-engaged to the first housing 150.

The pair of positioning holes 143A is formed to penetrate the flat plate part 141A in the Y axis direction. The pair of positioning holes 143A is arranged to sandwich the first opening 142A from the optical axis O direction (i.e., Z axis direction).

One of the positioning holes 143A, which is at one side (+Z side) of the optical axis O direction has a substantially rectangular shape when seen from the Y axis direction. In the meantime, the other positioning hole at the other side (−Z side) of the optical axis is circular.

An inner circumferential surface of the positioning hole 143A at the one side (+Z side) of the optical axis O is formed by two planes opposed to each other in the X axis direction and two planes opposed to each other in the Z axis direction (i.e., optical axis O), which planes are continuous.

In addition, the inner circumferential surface of the positioning hole 143A at the one side of the optical axis O direction is provided with a pressing part 149 that protrudes in the other side of the optical axis O direction and thus presses a protrusion 152A of the first housing 150, which will be described below. Specifically, the pressing part 149 protrudes from the other plane of the optical axis O direction toward one plane of the optical axis O direction. An end surface of the Z axis direction of the pressing parts 149 is opposed to the inner circumferential surface of the positioning hole 143A.

The leg parts 144A are provided at a backside (i.e., −Y direction-side) of both end edges of the Z axis direction of the flat plate part 141A and protrude downwardly, respectively. The pair of leg parts 144A has a planar end surface, respectively. An amount of protrusion from the flat plate part 141A to the end surfaces of the leg parts 144A is about 0.4 mm.

The second opening 145A is formed along the optical axis O direction between the side surface part 132A and the flat plate part 141A. In other words, the second opening 145A is formed, so that the side surface part 132A and the flat plate part 141A are connected at both end sides of the optical axis O direction and are spaced around a center.

The rib 155A has a plate shape and extends between one side of the optical axis O direction of the side surface part 132A and one side of the optical axis O direction of the flat plate part 141A. An edge of the rib 155A extends from the top surface part 131 at the side surface part 132A to the other side of the X axis direction of the flap plate part 141A. In other words, the rib 155A has a substantially right triangle, when seen from the optical axis O direction. In the meantime, while the rib 155A is provided only at one side of the optical axis O direction, the ribs 155B are provided at both sides of the flat plate part 141B with respect to the optical axis O direction.

The light source device 160 having the above configuration is fixed to the first housing 150 through screw-engagement by the screw 50.

[Configuration of First Housing]

In the following description, a configuration for screw-engaging the second housing 110 to the first housing 150 will be described. As shown in FIG. 4, the first housing 150 has a configuration for positioning and screw-engaging the second housing 110 so as to illuminate the laser light to the polygon mirror. Specifically, the first housing 150 has protrusions 152A, 152B and screw-engagement parts 153A, 153B provided for positioning the second housing 110 so that they form pairs in the X axis direction, as a configuration for positioning and screw-engaging the extending parts 140A, 140B of the second housing 110 with respect to a planar surface part 159. The protrusions 152A, 152B and the screw-engagement parts 153A, 153B protrude from the planar surface part 159 upwardly in the Y axis direction and are arranged in line in the Z axis direction. In the below, only one side will be described and the other side having the same configuration will not be described.

The pair of protrusions 152A protrude from the planar surface part 159 of the first housing 150 upwardly in the Y axis direction and the other protrusion of the Z axis direction has a cylinder shape. In the meantime, one of the protrusions 152A with respect to the Z axis direction has a substantially square column shape. When positioning the second housing 110, the one of the protrusions 152A with respect to the Z axis direction is inserted into the substantially rectangular positioning hole 143A that is formed at one side of the flat plate part 141A of the second housing 110 with regard to the Z axis direction and is pressed to the pressing part 149. In addition, the other protrusion 152A is inserted into the circular positioning hole 143A that is formed at the other side with respect to the Z axis direction.

The screw-engagement part 153A has a cylindrical shape and protrudes from the first housing 150 while penetrating the planar surface part 159 of the first housing 150 in the Y axis direction. The screw-engagement part 153A is formed with a hole extending in the Y axis direction and has a screw recess on inner circumferential surface thereof into which the screw 50 can be inserted in the Y axis direction (insertion direction). A portion of the screw-engagement part 153A, which protrudes in the +Y axis direction, is slightly tapered so that it reaches a point. This tip end portion (+Y direction end surface) has a tip end surface 156A having a circular ring shape when seen from the Y axis direction. An outer diameter of the screw-engagement part 153A is smaller than an inner diameter of the convex part 147 that is formed at the extending part 140A of the second housing 110. Accordingly, the screw-engagement part 153A can be inserted into the convex part 147.

The second housing 110 is screw-engaged to the screw-engagement parts 153A, 153B of first housing 150 configured as described above by the screw 50. Specifically, the protrusions 152A, 152B and the screw-engagement parts 153A, 153B of the first housing 150 are inserted into the positioning holes 143A, 143B and the first openings 142A, 142B of the second housing 110 from the Y axis direction. Then, the screw 50 is screw-engaged with the screw-engagement parts 153A, 153B, so that the first housing 150 and the second housing 110 are positioned.

In the meantime, the light source device 160 may be mounted to a scanner unit corresponding to a black-white laser or may be applied to a color laser printer. In addition, the screw-engaging member for screw-engaging the second housing 110 is not limited to the screw. For example, a nut or small screw is also usable.

[Positioning of Light Source with Respect to Second Housing]

Figure 6:
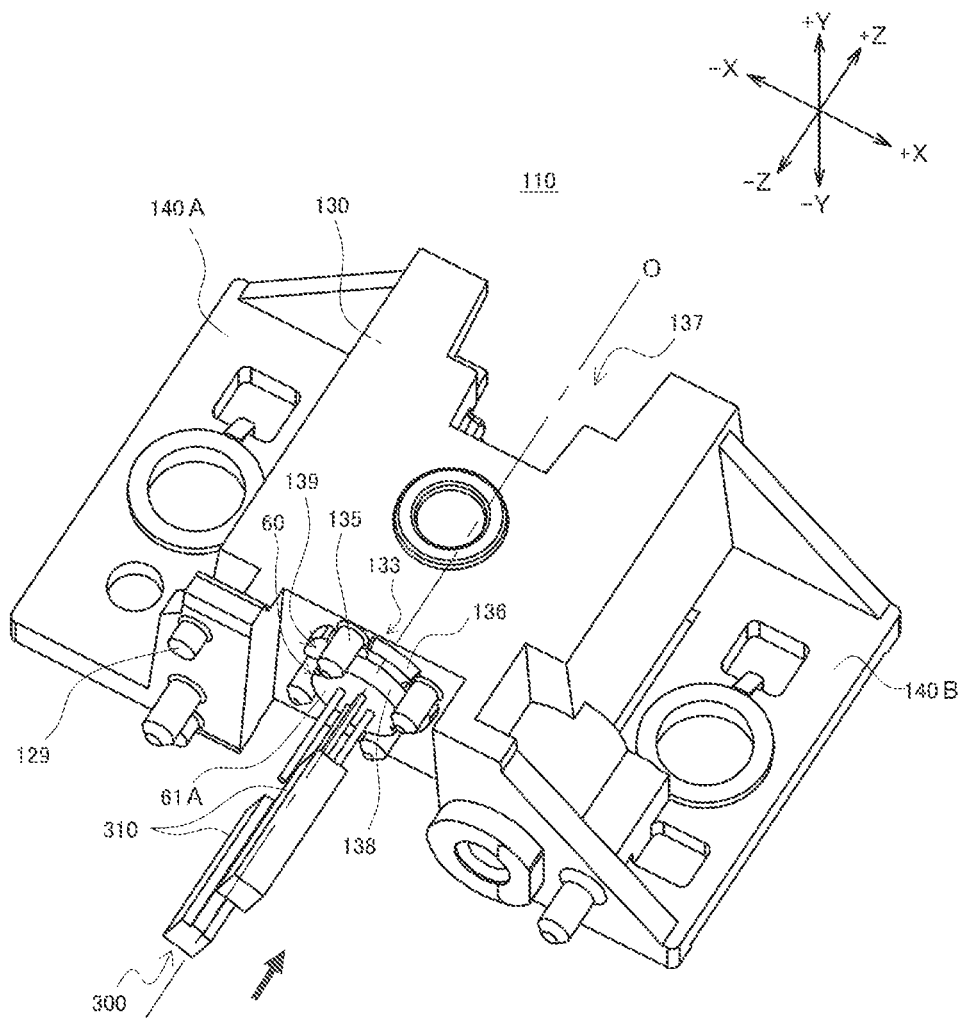
FIG. 6 is a perspective view of the second housing, which shows a state where the light source is inserted into a first housing.

Next, the positioning of the light source 60 with respect to the second housing 60 will be described in accordance with procedures of assembling the light source device 160. As shown in FIG. 6, at a first procedure, the light source 60 is held at the light source holder 133 of the second housing 150.

Specifically, the reference axis of the light source 60 is matched in the Z axis direction and the second cylindrical part 61B is inserted toward the fitting hole 134 from the −Z direction. Then, the side edge portion 138 of the first cylindrical part 61A is contacted to the peripheries of the holding protrusions 135. The first cylindrical part 61A is introduced in the +Z direction while enlarging the distance R1 between the holding protrusions 135 facing to each other (refer to FIG. 5A).

When the light source 60 is introduced into the light source holder 133, the first cylindrical part 61A collides with the front of the adhesion parts 136 and the further introduction thereof is thus blocked. When the side edge portion 138 of the first cylindrical part 61A is inserted into the light source 60, the light source 60 lightly holds the side edge portion 138 of the first cylindrical part 61A so that it can be relatively rotated to the four holding protrusions 135.

Here, the state of "lightly holding" the side edge portion means that the side edge portion 138 of the light source 60 is held at the light source holder 133 while the side edge portion linearly contacts the peripheries of the four holding protrusions 135 in the +Z direction and the light source 60 is rotatable about the reference axis. More specifically, the side edge portion 138 of the first cylindrical part 61A linearly contacts the four holding protrusions 135 in the optical axis O direction. As shown in FIG. 5A, since the distance between the holding protrusions 135 facing each other is slightly smaller than the diameter of the first cylindrical part 61A, the light source 60 is held while it is applied with the pressing force with which the light source is rotatable in the rotational direction from the light source holder 133.

In addition, when the first cylindrical part 61A is lightly held by the holding protrusions 135, the side edge portion 138 of the first cylindrical part 61A is exposed between the respective holding protrusions 135. In other words, except for the contact portion with the respective holding protrusions 135, the side edge portion 138 is opened by the openings 139 formed between the respective holding protrusions 135 so that it can be contacted from the outside.

In this illustrative embodiment, the center of rotation, which is the reference axis of the light source 60, coincides with the optical axis O. However, when the light source is held so that it can be rotated with respect to the traveling direction of the laser light emitted from the laser diodes (LDs) 62A, 62B of the light source 60, the reference axis may not completely coincide with the optical axis O.

Then, at a second procedure, the light source 60 is positioned by a jig 300. Specifically, a light emitting circuit (not shown) that is used for inspection for emitting the laser diodes (LDs) 62A, 62B is connected to the pins 63 of the light source 60 that is held at the light source holder 133. The light emitting circuit may be connected in advance at a step before the light source 60 is inserted into the light source holder 133 at the first procedure.

Then, the light source 60 is held to the jig 300. The jig 300 is a mechanism having arms 310 configured by rod-shaped members that are arranged at an interval. The arms 310 have a size that can be inserted into the opening 139. When the light source 60 is held by the arms 310, predetermined gaps are formed between the arms 310 and the holding protrusions 135. Since the gaps are formed between the arms 310 and the holding protrusions 135, the arms 310 can rotation-adjust the light source 60 in the rotational direction as the gaps. An operator or machine positions the jig 300 so that the arms 310 can be inserted into the openings 139, and inserts the arms 310 into the openings 139.

Figure 7:
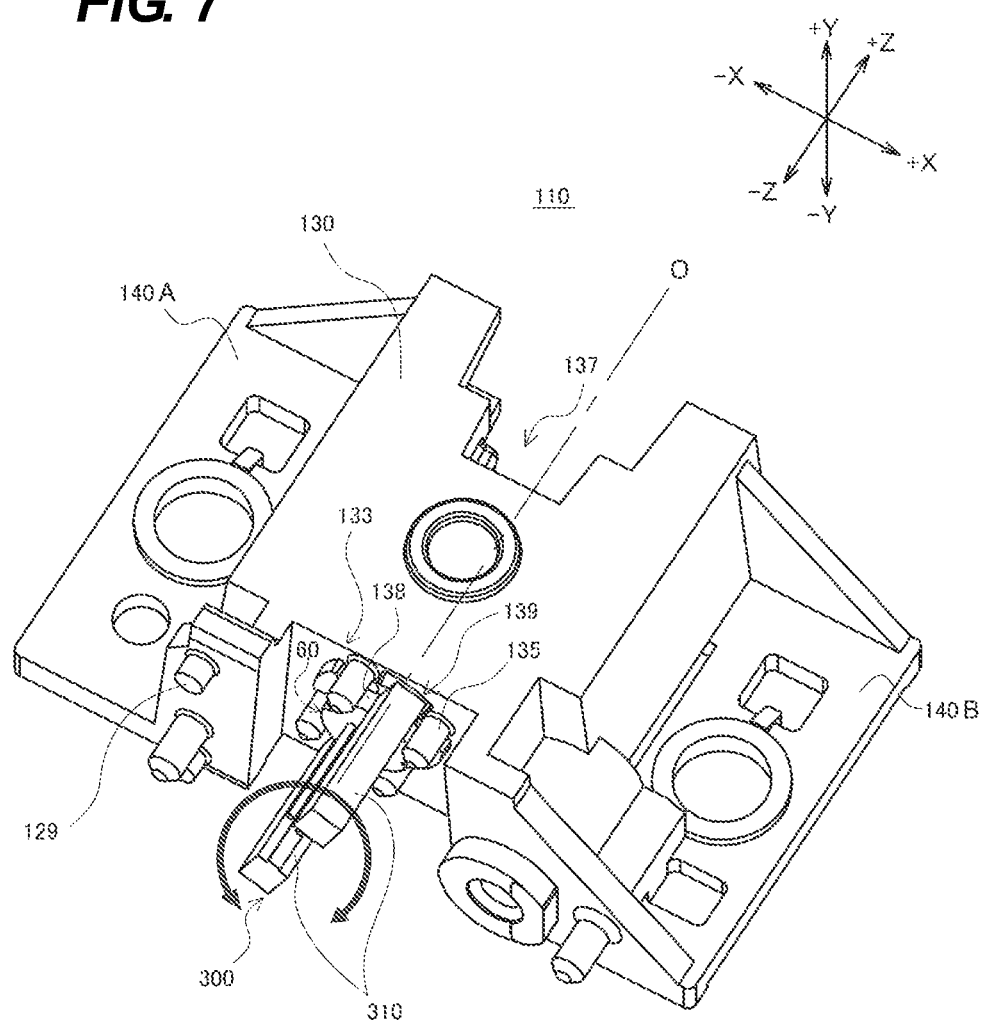
FIG. 7 is a perspective view of the second housing, which shows a state where the light source is rotation-adjusted by a jig.

The arms 310 inserted into the openings 139 hold the side edge portion 138 of the second housing 110. The jig 300 holding the side edge portion 138 adjusts a position of the light source 60 by rotating the light source 60 about the optical axis O (in the arrow direction), as shown in FIG. 7.

More specifically, the arms 310 hold the side edge portion 138 of the first cylindrical part 61A through the openings 139 that are opposed to each other. The jig 300 holding the light source 60 is rotated in the clockwise or counterclockwise direction with respect to the reference axis of the package 61. The light source 60 is rotated with being lightly held at the light source holder 133 while contact-sliding with the holding protrusions 135. During the rotation-adjustment, the holding protrusions 135 keep the holding state without getting away from the side edge portion 138.

During the rotation-adjustment, the light source 60 emits two laser lights from the laser diodes (LDs) 62A, 62B. The two laser lights pass through the light traveling hole 200 (refer to FIG. 3) and are projected on an equipment at the −Z axis.

An operator or equipment for adjustment rotates the light source 60 by the jig 300 depending on positions of the two projected laser lights.

When the light source 60 is rotated about the reference axis, the position of the laser diode (LD) 62, which is arranged with being deviated from the center of rotation, is changed. When the position of the laser diode (LD) 62 is changed, a phase of the laser light emitted from the laser diode (LD) is changed on the projection plane. When a phase of the laser light is changed, a pitch between the laser lights on the projection plane is also changed. The light source 60 is rotation-adjusted in such a way that an appropriate pitch is made in the sub-scanning direction when the two laser lights are scanned on a photosensitive member.

In the meantime, the rotatable range of the jig 300 depends on an interval of the holding protrusions 135 interposing the arms 310 therebetween, i.e., an area of the openings 139. In other words, the jig 300 can rotation-adjust the light source 60 until the arms 310 interfered with the holding protrusions 135. The area of the openings 139, which is required to rotation-adjust the light source 60, is preferably made in such a way that about 4 degrees are secured as the rotation degree of the light source 60.

When the position of the light source 60 is completely adjusted, the adhesive 126 is interposed between the adhesion parts 136 and the first cylindrical part 61A, thereby fixing the light source 60 to the light source holder 133 (refer to FIG. 5B). By the above process, the light source 60 is positioned at an appropriate location with respect to the second housing 110.

Then, at a third procedure, the coupling lens 125 is arranged at the lens holder 137 and the focus of the laser lights from the light source 60 is adjusted.

Specifically, the coupling lens 125 is arranged at the lens holder 137 by a jig (not shown). Under this state, uncured adhesive 126 is adhered to the peripheral edge of the coupling lens 125. Since the adhesive is interposed between the lens holder 137 and the coupling lens 125, which are both in non-contact state. While the adhesive 126 is not cured, the coupling lens 126 is positioned in the X, Y and Z axis directions with the jig, so that the focus of the laser light is adjusted.

Then, at a fourth procedure, the second housing 110 in which the positions of the light source 60 and the coupling lens 125 are adjusted is assembled to the first housing 150 (refer to FIG. 3). At this time, the pins are soldered to the circuit substrate 122, so that the light source 60 is assembled as the laser unit 120 to the second housing 110. At this time, the laser unit 120 is abutted with the top surfaces of the two contact protrusions 129 facing the flat plate part of the circuit substrate 122, so that the laser unit is positioned in the +Z direction in the light source holder 133.

In addition, the circuit substrate 122 is screw-engaged with the second housing 110 and the first housing 150 by the screw 50, so that the laser unit 120 fitted in the light source holder 133 is completely fixed to the second housing 110.

The second housing 110 is screw-engaged to the screw-engagement parts 153A, 153B of the first housing 150 configured as described above by the screw 50. The screw 50 is screw-engaged to the screw-engagement parts 153A, 153B, so that the first housing 150 and the second housing 110 are positioned. Then, the polygon mirror 180 and the cylindrical lenses 170A, 170B are assembled to the first housing 150, so that the scanner unit 100 is completed.

[Operations and Effects]

The above-described laser scanner unit 100 realizes the following effects.

The light source 60 is rotatably held at the light source holder 133. The light source holder 133 of the second housing 110 is formed with the openings 139 that expose the side edge portion 138 of the light source 60. By this configuration, it is possible to directly rotation-adjust the light source 60 held at the second housing 110 through the openings 139 by the jig. Since the light source 60 can be directly adjusted by the jig, it is possible to adjust the pitch between the laser diodes (LDs) 62A, 62B in the light source 60 with higher precision.

In addition, since the openings 139 are formed to face each other with the reference axis of the package 61 being interposed therebetween, it is possible to rotation-adjust the light source 60 by the jig with the reference axis being interposed. Accordingly, it is possible to easily adjust the rotation of the light source 60.

In addition, the second cylindrical part 61B which receives the laser diodes (LDs) 62A, 62B therein is inserted into the fitting hole of the main body 130 and the first cylindrical part 61A is held by the holding protrusions 135, so that it is possible to adjust the position of the light source 60 from a direction opposite to the light emitting direction.

In addition, since the light source 60 is held by the plurality of holding protrusions 135 extending in the optical axis O direction, it is possible to stably hold the light source 60 over the reference axis direction, i.e., the traveling direction of the light flux. In addition, the holding protrusions 135 are formed to extend in the reference axis direction, so that it is possible to form the openings 139 between the holding protrusions 135.

In particular, since the light source 60 is held while being linearly contacted to the cylindrical holding protrusions 135 over the optical axis O direction, it is possible to stably hold the light source 60 over the traveling direction of the light flux. In addition, due to the linear contact, the load caused due to the friction with the holding protrusions 135 when adjusting the rotation of the light source 60 is less. Accordingly, it is possible to easily adjust the light source in the rotational direction.

In addition, the light source 60 and the coupling lens 125 are held at the second housing 110 that is separate from the first housing 150. Thereby, it is possible to adjust the illumination position (particularly, adjustment except for the rotational direction) of the laser light to the polygon mirror 180 supported to the first housing 150. In other words, by performing the position adjustment except for the rotational direction, it is possible to precisely determine the position of the main or sub-scanning direction of the laser light and the illumination position of the laser light to the polygon mirror 180.

In addition, since the second housing 110 and the light source 60 are fixed with the adhesive, it is possible to securely fix the light source 60 after the rotation-adjustment.

In addition, since the second housing 110 is made of resin, it is possible to give the spring property to the holding configuration of the light source 60. Accordingly, the light source 60 is stably held at the holding protrusions 135.

Other Illustrative Embodiments

Other illustrative embodiments of the present invention will be described. Only the features different from the above illustrative embodiment will be described below and parts common to the above illustrative embodiment will be indicated with the same reference numerals and the descriptions thereof will be omitted.

Figure 8:
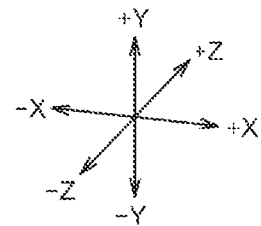
FIG. 8 is a perspective view of the second housing according to another illustrative embodiment.
Figure 8:
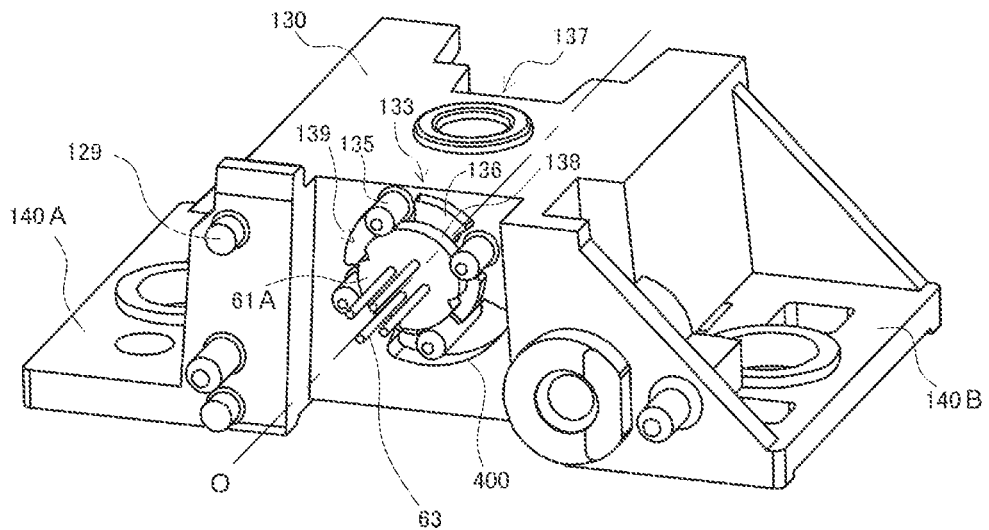

As shown in FIG. 8, the four holding protrusions 135 extend from the main body 130 of the second housing 110 in the −Z direction. One of the four holding protrusions 135 is configured to press the light source 60 held at the light source holder 133 toward the three holding protrusions 135.

Specifically, the second housing 110 is formed with a long hole 400 that surrounds a bottom part of one holding protrusion 135. The rigidity of the surrounding of the holding protrusion 135 is lower than that of the other holding protrusions 135 due to the long hole 400. Thus, the holding protrusion 135 close to the long hole 400 is apt to be bent in the X or Z direction.

Accordingly, the holding protrusion 135 around the long hole 400 can press the light source 60 held at the light source holder 133 toward the three holding protrusions 135 by bending. By this configuration, even if there is a deviation regarding the diameter of the light source 60 and the light source 60 having a diameter greater than a normal diameter is inserted in the light source holder 133, one of the holding protrusions 135 is bent against the bending force and thus enables the light source to be inserted into the light source holder 133. Furthermore, one holding protrusion 135 presses the light source 60 toward the other holding protrusions 135, so that the light source holder 133 can hold the light source 60 while pressing the light source with pressure that can rotate the light source.

Figure 9:
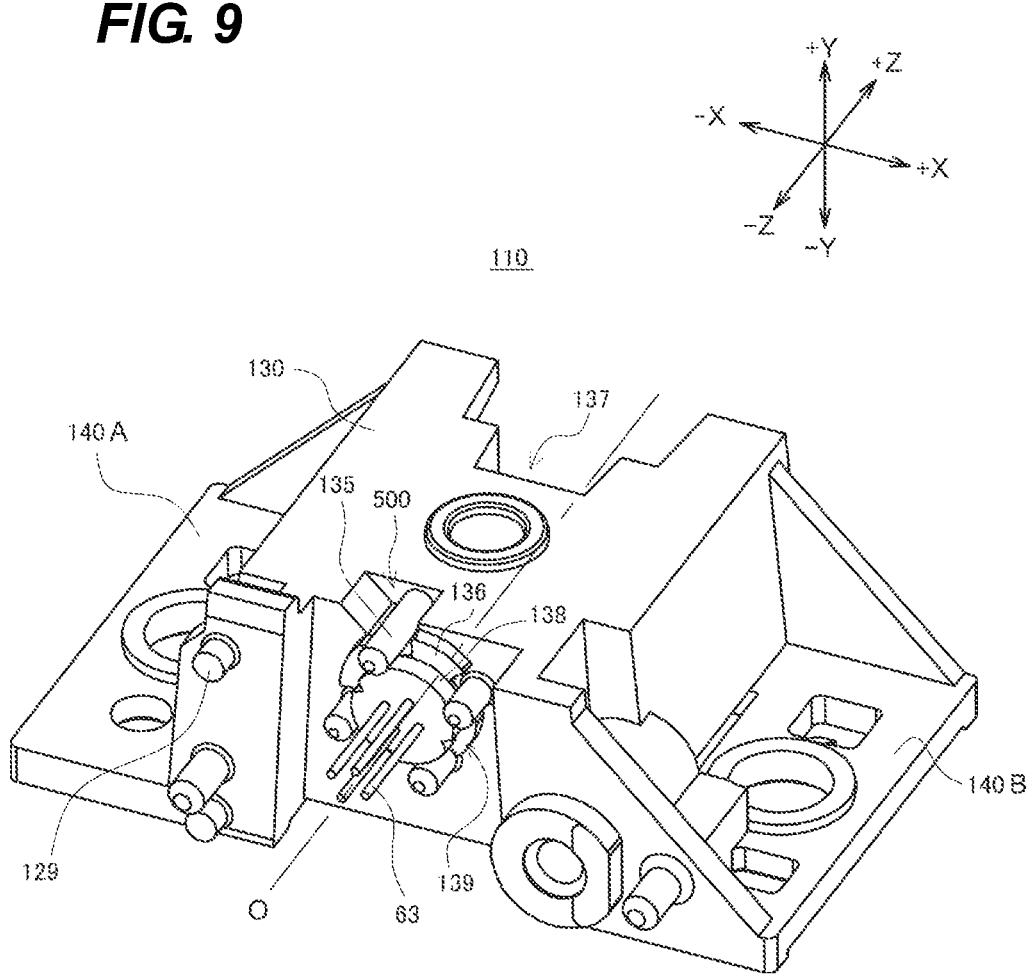
FIG. 9 is a perspective view of the second housing according to another illustrative embodiment.

In addition, regarding the configuration for giving the bending property to the holding protrusions 135, one of the holding protrusions 135 may be made to be longer than the other holding protrusions 135, as shown in FIG. 9. A recessed part 500 is formed at the light source holder 133 of the second housing 110. One holding protrusion 135 extends from the recessed part 500 in the −Z direction. The holding protrusion 135 extending from the recessed part 500 is longer than the other holding protrusions 135. Accordingly, since a tip end of the holding protrusion 135 extending from the recessed part 500 is more distant from the second housing 110 than tip ends of the other holding protrusions 135, it is apt be to be bent relatively.

When the light source 60 is inserted into the light source holder 133 configured as described above, the side edge portion 138 of the light source 60 is contacted to idle ends of the holding protrusion 135. At this time, the holding protrusion 135 extending from the recessed part 500 presses the light source 60 toward the other holding protrusions 135 by using the bending thereof. Accordingly, the same effects as the above are realized.

Figure 10:
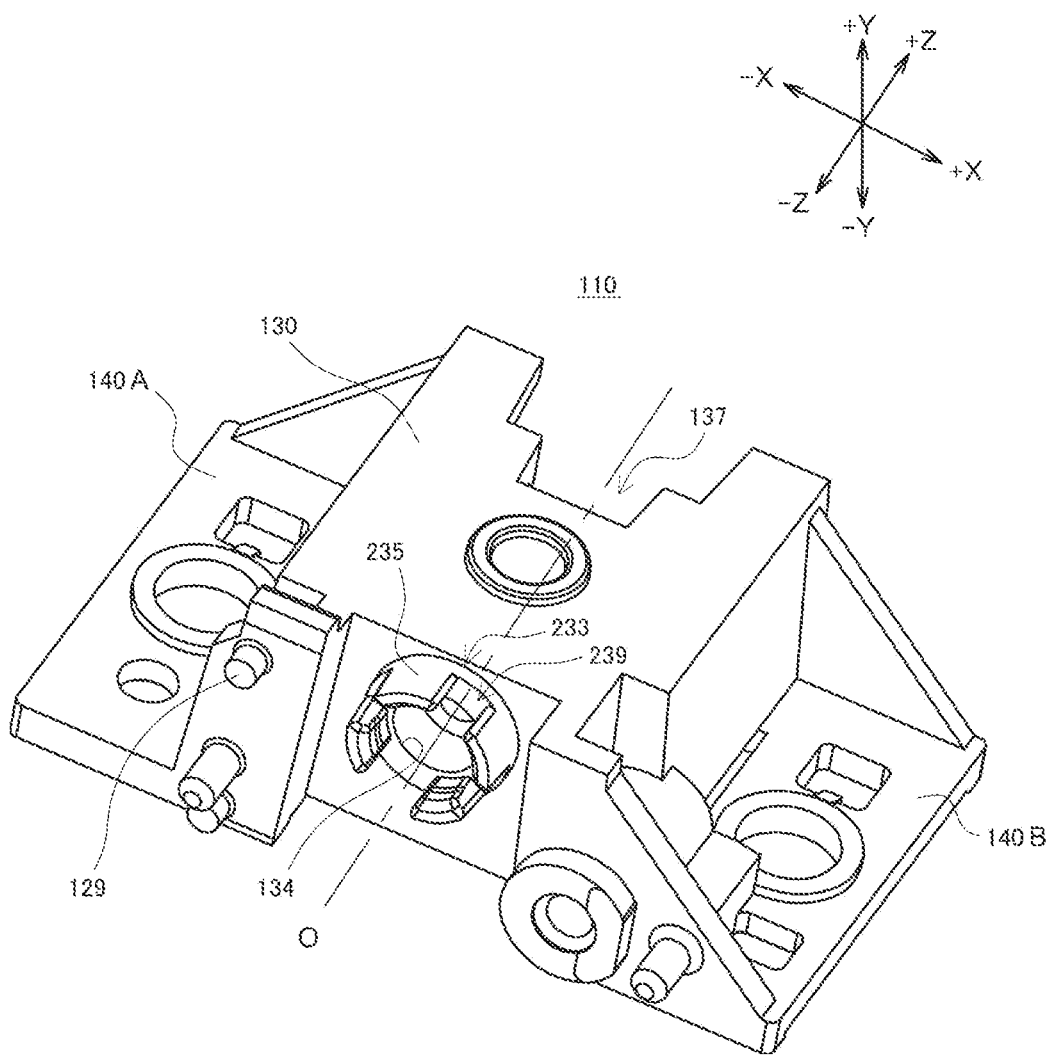
FIG. 10 is a perspective view of the second housing according to a) illustrative embodiment.

In addition, the shape of the light source holder 133 for rotatably holding the light source 60 can be variously modified. As shown in FIG. 10, the main body 130 of the second housing 110 extends a substantially cylindrical light source holder 233 in the −Z direction. The light source holder 233 has a fitting hole 134 and a cylinder part 235 (an example of an extending part) that is concentric to the fitting hole 134.

The cylinder part 235 is formed at a periphery thereof with notch portions 239 (an example of an opening) at a predetermined interval. The notch portions 239 are formed at four positions in the circumferential direction of the cylinder part 235. The respective notch portions 239 are formed at positions facing each other about the reference axis of the light source 60.

The cylinder part 235 has a contact surface with the light source 60 at an inner circumferential surface thereof. The cylinder part 235 can hold the light source 60 therein. A curvature of the inner circumferential surface of the cylinder part 235 is substantially the same as a curvature of the side edge portion 138 of the light source 60. When the light source 60 is inserted into the cylinder part 235, the light source 60 is lightly held in the cylinder part 235. Under a state where the light source is lightly held in the cylinder part 235, the light source 60 exposes the side edge portion 138 through the notch portions 239. In addition, the cylinder part 235 surface-contacts the light source 60. Under a state where the light source 60 is held in the cylinder part 235, a jig (not shown) is inserted in the notch portions 239 and the light source 60 can be thus held. By rotating the jig in the rotational direction, the rotation-adjustment of the light source 60 is performed.

The second housing 110 configured as described above realizes the following effects. In other words, the cylinder part 235 has the contact surface that contacts the side edge portion 138 of the light source 60 and the light source holder 133 contacts the light source 60 over the rotational direction about the reference axis. That is, the light source holder 133 surface-contacts the light source 60. Thereby, it is possible to effectively transmit the heat generation of the light source 60 to the second housing 110 through the light source holder 133.

Figure 11:
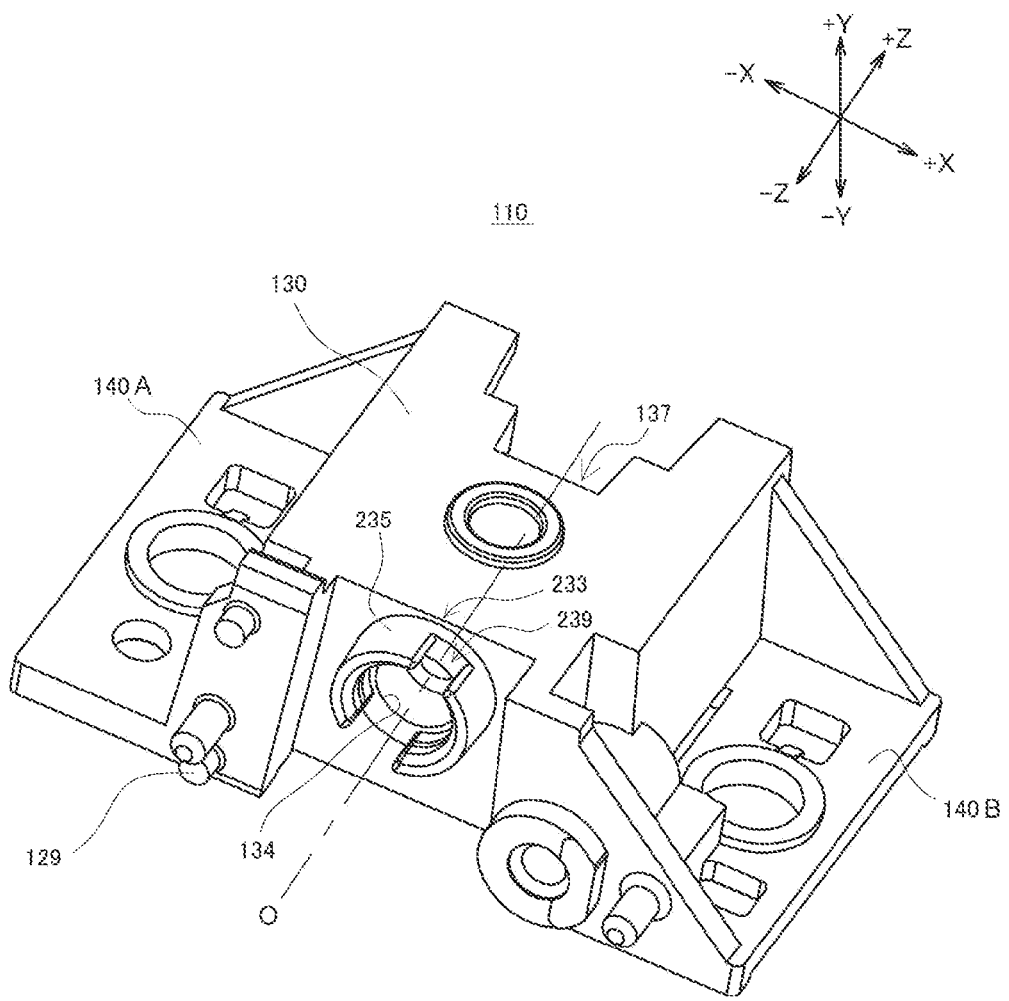
FIG. 11 is a perspective view of the second housing according to another illustrative embodiment.

In the meantime, the number of the notch portions 239 may not be four. In other words, as shown in FIG. 11, two notch portions 239 may be formed at the cylinder part 235. At this time, the notch portions 239 are preferably formed at positions that are opposed to each other about the optical axis. By making the notch portions 239 face each other, it is possible to stably hold the light source 60 with the jig and to thus adjust the light source in the rotational direction.

In addition, the number of laser diodes (LDs) may be two or more. In other words, the inventive concept of the present invention can be applied to a light source device for which the rotation adjustment is necessary, regardless of the number of laser diodes, for example, three or four.

In the above illustrative embodiments, the shape of the light source 60 is cylindrical. However, the inventive concept of the present invention can be applied so that the light source having the other shape is rotatably held. For example, it may be possible that a planar surface is formed at a part of the side edge portion 138 of the light source 60 forming a curved surface so that the jig can be easily contacted thereto. The shape of the light source holder 133 may be appropriately changed depending on the shape of the light source 60. In addition, the diameter R2 of the light source 60 having the cylindrical shape may be longer or shorter than a length of the rotational axis direction of the light source 60.

In the above illustrative embodiments, the first housing 150 and the second housing 110 are separate. However, the first housing and the second housing may be integrated. In other words, the first housing 150 holding the polygon mirror 180 and the second housing 110 holding the light source 60 and the coupling lens 125 are integrated, so that the assembling is possible with high precision.

What is claimed is:

1. A multi-beam light source device comprising:
   a light source including:
      a cylindrical package having a side edge portion which extends in a rotational direction about a rotational axis line defined as a first direction;
      a plurality of light emitting units which are disposed in the cylindrical package and configured to emit laser light in the first direction; and
   a housing which holds the light source,
   wherein the housing has a holder that holds the side edge portion of the cylindrical package to be relatively rotatable in the rotational direction, and wherein the holder is formed with at least one opening which exposes the side edge portion of the light source.

2. The multi-beam light source device according to claim 1, wherein the holder is formed with at least two openings which are formed to face each other across the rotational axis line.

3. The multi-beam light source device according to claim 1, wherein the package includes:
   a first cylindrical part having the side edge portion formed thereto; and
   a second cylindrical part having a diameter smaller than the first cylindrical part, wherein the plurality of light emitting units are disposed in the second cylindrical part such that the laser light is emitted in a direction opposite to the first cylindrical part,
wherein the housing has a main body, into which the second cylindrical part is inserted, and
wherein the holder extends from the main body in a direction opposite to a light emitting direction of the laser light and holds the side edge portion of the first cylindrical part.

4. The multi-beam light source device according to claim 1, wherein the holder has a plurality of extending parts extending in a direction of the rotational axis line.

5. The multi-beam light source device according to claim 4, wherein each of the plurality of extending parts includes a cylindrical part extending in the direction of the rotational axis line.

6. The multi-beam light source device according to claim 4, wherein each of the plurality of extending parts has a contact surface along a circumferential surface of the side edge portion of the light source over the rotational direction.

7. The multi-beam light source device according to claim 1, wherein the housing has an adhesion part, to which an adhesive for adhering the light source with the housing is applied.

8. The multi-beam light source device according to claim 1, wherein the package is made of metal and the housing is made of resin.

9. The multi-beam light source device according to claim 3, wherein at least one of the extending parts presses the light source toward the other extending parts.

10. The multi-beam light source device according to claim 2, wherein the holder is provided symmetrically with respect to the rotational axis line.

11. The multi-beam light source device according to claim 10, wherein the holder has a plurality of extending parts extending in a direction of the rotational axis line, and
wherein the plurality of extending parts are provided symmetrically with respect to the rotational axis line.

12. The multi-beam light source device according to claim 2, wherein the side edge portion of the package is formed with a notch which opposes each of the openings.

13. A multi-beam scanning device comprising:
   a multi-beam light source device including:
      a light source including:
         a cylindrical package having a side edge portion which extends in a rotational direction about a rotational axis line defined as a first direction;
         a plurality of light emitting units which are disposed in the cylindrical package and configured to emit laser light in the first direction; and
         a housing which holds the light source, wherein the housing has a holder that holds the side edge portion of the cylindrical package to be relatively rotatable in the rotational direction, and wherein the holder is formed with at least one opening which exposes the side edge portion of the light source;
   an optical element configured to convert the laser light emitted from the light source into light flux; and
   a deflector configured to deflect light, which is converted into the light flux.

14. The multi-beam scanning device according to claim 13, further comprising:
   a first housing which holds the deflector;
   wherein the housing is a second housing, which is separate from the first housing and is held by the first housing, and
   wherein the second housing holds the light source and the optical element.

* * * * *